2,848,502
Patented Aug. 19, 1958

2,848,502

PREPARATION OF LINALOOL

Joseph Donald Surmatis, West Caldwell, N. J., assignor to Hoffmann-La Roche Inc., Nutley, N. J., a corporation of New Jersey No Drawing. Application November 27, 1956
Serial No. 624,484

8 Claims. (Cl. 260—631.5)

This invention relates to a novel chemical process. More particularly, it relates to a novel process of making linalool (3,7-dimethyl-1,6-octadien-3-ol) by chemical reduction of dehydrolinalool (3,7-dimethyl-1-octyn-6-en-3-ol).

One embodiment of the invention may be briefly described as residing in a process of making linalool which comprises reducing dehydrolinalool, dissolved in liquid ammonia, by means of an alkali metal and an ammonium salt of an acid.

Any alkali metal can be used, e. g. lithium, sodium, and potassium; but sodium will ordinarily be preferred for reasons of economy. Any ammonium salt of an acid can be employed, e. g. ammonium sulfate, ammonium chloride, ammonium nitrate, ammonium acetate and the like; but ordinarily ammonium salts of strong mineral acids are preferred, especially ammonium sulfate. A convenient mode of execution comprises mixing the dehydrolinalool and the ammonium salt in the liquid ammonia, and adding alkali metal to the reaction mixture in small portions, so as to cause gentle refluxing thereof, until the reaction is complete. At least 2 mols of ammonium salt and at least 2 gram atoms of alkali metal should be used, per mol of dehydrolinalool, in order to insure complete reaction.

In the embodiment of the invention described above, the nature of the chemical reaction may be visualized in terms of the following equation, wherein sodium and ammonium sulfate are used as specific illustrations of alkali metal and ammonium salt respectively:

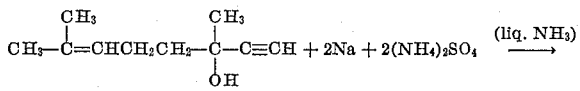

(I)

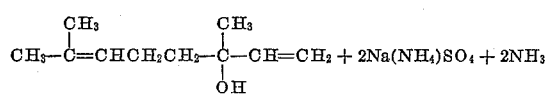

A conventional method of making dehydrolinalool is by ethinylation of 6-methyl-5-hepten-2-one in liquid ammonia. In another of its aspects, the invention provides a method of reducing dehydrolinalool in situ as made by the conventional method referred to above. In this embodiment, the invention teaches a process of making 3,7-dimethyl-1,6-octadien-3-ol which comprises condensing 6-methyl-5-hepten-2-one with acetylene in ammonia in the presence of alkali metal, and reacting the resulting alkali metal alkoxide of 3,7-dimethyl-1-octyn-6-en-3-ol in situ with alkali metal and ammonium salt of an acid. The same alkali metals and ammonium salts can be employed as referred to in connection with the first described embodiment of the invention. However, when reducing dehydrolinalool in situ as made from methylheptenone, it is necessary to employ at least 3 gram atoms of ammonium salt and at least 2 gram atoms of alkali metal per mol of dehydrolinalool, in order to insure complete reduction. The nature of the chemical reactions in the second embodiment of the invention, referred to above, can be visualized in terms of the following equations:

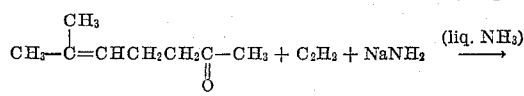

(II)

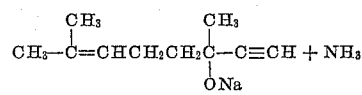

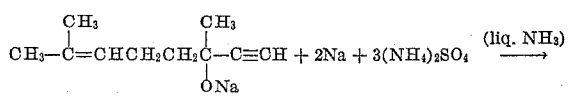

(III)

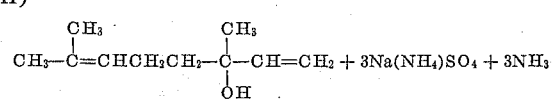

The invention is further disclosed in the following examples, which are illustrative but not limitative thereof.

Example 1

To six liters of liquid ammonia in a 12 liter flask fitted with a solid carbon dioxide condenser were added 1000 g. of racemic 3,7-dimethyl-1-octyn-6-en-3-ol and 1760 g. of ammonium sulfate. 328 g. of metallic sodium was cut up into small cubes and fed into the reaction mixture over a period of two hours. The pieces of sodium showed blue streaks as they were stirred in the reaction, but the color disappeared as the sodium was rapidly consumed. There was some refluxing in the condenser during the sodium addition.

The ammonia was allowed to distill off overnight, and four liters of water were stirred into the reaction vessel to dissolve the salts. The almost colorless oily layer was separated, and the aqueous portion was extracted twice with 500 cc. of "Skellysolve-B" (essentially a normal hexane petroleum fraction, B. R. 140°–160° F.). The combined organic fractions were washed with water and dried over anhydrous sodium sulfate.

On distillation through a packed column of about five theoretical plates the following fractions were obtained:

| Fraction No. | B. P. | $n_D^{25}$ | Weight |
|---|---|---|---|
| 1 | 62°–68° C. at 20 mm | 1.4486 | 43.0 |
| 2 | 92° C. at 17 mm | 1.4592 | 82.3 |
| 3 | do | 1.4598 | 49.7 |
| 4 | do | 1.4598 | 53.1 |
| 5 | do | 1.4600 | 51.6 |
| 6 | do | 1.4600 | 52.7 |
| 7 | do | 1.4600 | 52.3 |
| 8 | do | 1.4600 | 53.7 |
| 9 | do | 1.4600 | 54.2 |
| 10 | do | 1.4600 | 46.4 |
| 11 | do | 1.4600 | 53.3 |
| 12 | do | 1.4600 | 50.2 |
| 13 | do | 1.4600 | 51.4 |
| 14 | do | 1.4600 | 43.4 |
| 15 | do | 1.4600 | 47.1 |
| 16 | do | 1.4600 | 48.1 |
| 17 | do | 1.4600 | 47.7 |
| 18 | do | 1.4600 | 43.1 |
| 19 | do | 1.4606 | 37.1 |
| Still hold up | | | 53.6 |

Fraction No. 1 contained a substantial proportion of dihydromyrcene. A certain amount of this hydrocarbon was present also in fraction No. 2; which, however, was comprised mainly of linalool. Fractions Nos. 3 to 19, and most of the still hold up, comprised essentially linalool.

Example 2

One liter of liquid ammonia was placed in a two liter flask, which was fitted with a solid carbon dioxide condenser, a dropping funnel and stirrer. In the ammonia was dissolved 24.2 g. (1.05 gram atoms) of sodium. Acetylene gas was bubbled into the reaction mixture until the color of the solution changed from blue to white. Then 126 g. (1 mol) of 6-methyl-5-hepten-2-one was dissolved in an equal volume of dry diethyl ether and was added from the dropping funnel in one hour. After addition of the ketone, the reaction mixture was stirred overnight at reflux temperature.

403 g. (3.05 mols) of ammonium sulfate was weighed out and added to the reaction mixture in a single portion. 46 g. (2 gram atoms) of metallic sodium was cut up into small pieces of ¼ g. each, and added to the reaction mixture in two hours. (At the end of this period a sample was withdrawn from the flask and tested for unreduced material. If the test was positive, an additional portion of sodium was added.)

When the reduction was completed, the ammonia was evaporated overnight, and the residue in the flask was taken up in 1.5 l. of water. The organic layer was separated, and the aqueous portion was extracted with 500 cc. of petroleum ether. The organic layer was combined with the petroleum ether extract and the combined liquids were washed neutral with water and dried over anhydrous sodium sulfate. On distillation of the dried product, 3,7-dimethyl-1,6-octadien-3-ol was obtained, free of 3,7-dimethyl-1-octyn-6-en-3-ol. The material had $n_D^{25}=1.4600$.

Example 3

One liter of liquid ammonia was condensed in a two liter flask, which was equipped with a stirrer and a solid carbon dioxide condenser. 152 g. (1 mol) of racemic 3,7-dimethyl-1-octyn-6-en-3-ol and 264 g. (2 mols) of ammonium sulfate were added to the reaction flask. 46 g. (2 gram atoms) of metallic sodium was cut up into small pieces of about ¼ g. and was added to the reaction mixture over a period of two hours. The ammonia was then distilled off, and the residue in the flask was taken up in one liter of water. The oily layer was separated, and the aqueous portion was extracted with 500 cc. of petroleum ether. The combined oily layer and extract were washed neutral with water, dried over anhydrous calcium sulfate and distilled under a vacuum of 20 mm. Hg. There was obtained 3,7-dimethyl-1,6-octadien-3-ol of a high purity and excellent perfumistic quality. The material distilled at 97° C./20 mm. Hg.

Example 4

24.2 g. (1.05 gram atoms) of metallic sodium was dissolved in one liter of liquid ammonia, contained in a two liter flask fitted with a solid carbon dioxide condenser, a dropping funnel and a stirrer. Acetylene gas was bubbled into the reaction mixture until the blue color changed to white. The flow of acetylene was continued for an additional two hours. Then 126 g. (1 mol) of 6-methyl-5-hepten-2-one was dissolved in 150 cc. of dry diethyl ether and was dropped into the stirred reaction mixture in one hour at reflux temperature. Stirring was continued overnight. The following morning, the ammonia was distilled off and was replaced with one liter of fresh liquid ammonia.

To the stirred mixture was added 56.2 g. (1.05 mols) of ammonium chloride. After stirring for fifteen minutes, 264 g. (2.0 mols) of ammonium sulfate was added. 46 g. (2 gram atoms) of metallic sodium was cut up into small pieces and was added in two hours.

The ammonia was removed overnight, and the residue was taken up in one liter of water. The oily layer was separated, washed neutral, and distilled under vacuum. The product, a high grade linalool, boiled at 92° C./17 mm. Hg; $n_D^{25}=1.4600$.

Example 5

In one liter of liquid ammonia was dissolved 15.3 g. (2.2 gram atoms) of metallic lithium. Acetylene gas was bubbled into the stirred solution until the color changed from blue to white. Then 126 g. of 6-methyl-5-hepten-2-one was dropped in from a funnel in one hour, and the reaction mixture was stirred at reflux temperature for 12 hours. 422 g. (3.2 mols) of ammonium sulfate was added to the reaction mixture. 50.6 g. (2.2 gram atoms) of metallic sodium was cut up into small pieces and dropped into the reaction mixture over a period of two hours. The ammonia was allowed to distill off overnight. The residue was taken up in a liter of water. The oil was separated, washed neutral, dried over anhydrous calcium sulfate and distilled. There was obtained an excellent grade of linalool, distilling at 92° C./17 mm. Hg; $n_D^{25}=1.4600$.

I claim:

1. A process of making 3,7-dimethyl-1,6-octadien-3-ol which comprises reducing 3,7-dimethyl-1-octyn-6-en-3-ol in liquid ammonia with an alkali metal and an ammonium salt of a strong mineral acid.

2. A process of making 3,7-dimethyl-1,6-octadien-3-ol which comprises condensing 6-methyl-5-hepten-2-one with acetylene in liquid ammonia in the presence of alkali metal, and reacting the resulting alkali metal alkoxide of 3,7-dimethyl-1-octyn-6-en-3-ol in situ with alkali metal and ammonium salt of an acid.

3. A process according to claim 2 wherein sodium and ammonium sulfate are employed.

4. A process which comprises reacting alkali metal alkoxide of 3,7-dimethyl-1-octyn-6-en-3-ol in liquid ammonia with alkali metal and ammonium salt of a strong mineral acid, thereby producing 3,7-dimethyl-1,6-octadien-3-ol.

5. A process according to claim 4 wherein the sodium alkoxide of 3,7-dimethyl-1-octyn-6-en-3-ol is reacted with sodium and ammonium sulfate.

6. A process of making linalool which comprises commingling with an alkali metal a mixture containing liquid ammonia, dehydrolinalool and an ammonium salt of a strong mineral acid.

7. A process of making 3,7-dimethyl-1,6-octadien-3-ol which comprises condensing 6-methyl-5-hepten-2-one with acetylene in liquid ammonia in the presence of a slight excess over one gram-atomic proportion of alkali metal, adding to the reaction mixture a slight excess over three molar proportions of an ammonium salt of a strong mineral acid, and then adding to the reaction mixture about two gram-atomic proportions of alkali metal.

8. A process according to claim 7 wherein sodium is employed as the alkali metal and ammonium sulfate is employed as the ammonium salt of a strong mineral acid.

References Cited in the file of this patent

Campbell et al.: J. A. C. S., vol. 63, pp. 216–19.
Campbell et al.: Ibid., vol. 63, pp. 2683–5.

UNITED STATES PATENT OFFICE
CERTIFICATE OF CORRECTION

Patent No. 2,848,502                                August 19, 1958

Joseph Donald Surmatis

It is hereby certified that error appears in the printed specification of the above numbered patent requiring correction and that the said Letters Patent should read as corrected below.

Column 2, line 50, in the table, heading to the fourth column, for "Weight" read -- Weight (g.) --.

Signed and sealed this 4th day of November 1958.

(SEAL)
Attest:

KARL H. AXLINE
Attesting Officer

ROBERT C. WATSON
Commissioner of Patents